United States Patent Office 3,547,970
Patented Dec. 15, 1970

3,547,970
N,N - DIMETHYL - N' - (DIMETHYL AND ETHYL)-PHENYL - N' - FLUORO -DI - CHLOROMETHYL-MERCAPTO-SULFAMIDES
Engelbert Kühle, Bergedorf Gladbach, Erich Klauke, Odenthal-Hahnenberg, Ferdinand Grewe, Burscheid, Ingeborg Hammann, Cologne, Helmut Kaspers, Leverkusen, Günter Unterstenhöfer, Opladen, and Hans Scheinpflug, Leverkusen, Germany, assignors to Farbenfabriken Bayer Aktiengesellschaft, Leverkusen, Germany, a corporation of Germany
No Drawing. Filed July 25, 1968, Ser. No. 747,496
Claims priority, application Germany, Aug. 11, 1967, F 53,200
Int. Cl. C07c 145/00
U.S. Cl. 260—453          4 Claims

ABSTRACT OF THE DISCLOSURE

N,N-dimethyl-N'-(2,4- or 3,4-dimethyl- or 4 - ethyl-phenyl) - N' - fluorodichloromethylmercapto-sulfamides which possess fungicidal and acaricidal properties and which may be produced by reacting the corresponding N,N-dimethyl-N'-substituted phenyl-sulfamide in the presence of an acid-binding agent, with fluorodichloromethanesulfenic acid chloride.

---

The present invention relates to and has for its objects the provision for particular new sulfenic acid derivatives which possess fungicidal and acaricidal properties, active compositions in the form of mixtures of such compounds with solid and liquid dispersible carrier vehicles, and methods for producing such compounds and for using such compounds in a new way especially for combating fungi and/or acarids, with other and further objects becoming apparent from a study of the within specification and accompanying examples.

It is known that sulfenic acid derivatives of the formula:

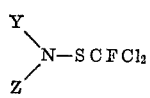

in which Y and Z are CO groups and/or $SO_2$ groups which are joined to identical or different organic radicals, to a (possibly substituted) amino group, or, jointly with ring linkage, to an organic radical; or Z is an organic radical which is possibly attached to the nitrogen via a further hetero atom, can be used as fungicides and/or acaricides (see German published Patents 1,193,498 and 1,190,723). The compound N,N-dimethyl-N'-phenyl-N'-thiofluorodichloromethylsulfamide (A) has already obtained importance in practice.

It has been found in accordance with the present invention that the particular new sulfenic acid derivatives, i.e., N,N-dimethyl-N'-(dimethyl and ethyl)-phenyl-N'-fluorodichloromethylmercapto-sulfamides, having the formula

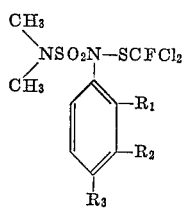

with the proviso that $R_1$ is hydrogen when $R_2$ and $R_3$ are each methyl; $R_1$ and $R_3$ are each methyl when $R_2$ is hydrogen; and $R_1$ and $R_2$ are each hydrogen when $R_3$ is ethyl, exhibit strong fungicidal and acaricidal properties.

It has been furthermore found in accordance with the present invention that a versatile and smooth process for the production of the particular new sulfenic acid derivatives of Formula I above in favorable yields may be provided, which comprises reacting a sulfamide having the formula

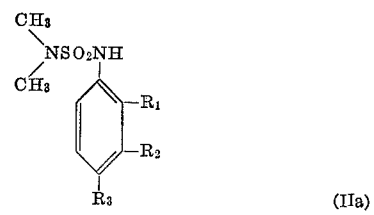

in which $R_1$, $R_2$ and $R_3$ are the same as defined above, in the presence of an acid-binding agent, with fluorodichloromethanesulfenic acid chloride (IIb), optionally in an organic solvent or in an aqueous medium.

It is extraordinarily surprising that the particular new sulfenic acid derivatives of the present invention exhibit a higher acaricidal and a higher and broader fungicidal activity than the previously known compounds of this class of substance.

The reaction for producing the particular new compounds of the present invention is exemplified by the following specific scheme:

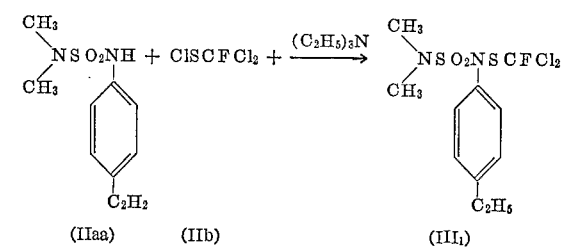

As solvent which may be optionally present for the reaction, water and all inert organic solvents are suitable. Preferred solvents include hydrocarbons, such as benzene, toluene and xylene; chlorinated hydrocarbons, such as chlorobenzene; and ethers such as dioxan. As acid-binding agents there may be mentioned tertiary amines, such as triethylamine and dimethylbenzylamine; alkali metal hydroxides, such as sodium hydroxide, alkali metal carbonates, such as sodium and potassium carbonate, and prepared chalk.

The reaction temperatures can be varied within a fairly wide range. In general, the reaction is carried out at substantially between about 0–80° C., and preferably at about 10–70° C.

When carrying out the reaction, approximately equimolar amounts of the reactants and auxiliary materials (e.g., acid-binding agent) are normally used. The working up of the reaction mixture may be effected in the usual manner.

Advantageously, the instant active compounds exhibit a strong fungitoxic activity. Because of their good compatibility with higher plants such compounds can therefore be used as plant protection agents against fungal diseases of plants.

The particular new active compounds of the present invention act against a large number of phytopathogenic fungi from the groups of the Phycomycetes (for example

*Phytophthora infestans, Plasmopara viticola,* and the like), the Ascomycetes (for example *Venturia inaequalis,* and the like) as well as against organisms causing genuine mildew diseases from the family of the Erysiphaceae (for example *Podosphaera leucotricha, Sphaerotheca pannosa, Oidium tuckeri,* and the like) and also against organisms from the group of the Fungi Imperfecti such as *Botrytis cinerea,* and the like.

The compounds are particularly effective against phytopathogenic fungi from the group of the nonmildew fungi, for example, e.g., Fusicladium.

Furthermore, the instant active compounds also exhibit strong acaricidal activities. The effects set in rapidly and are long-lasting. The instant active compounds can therefore be used with good results for the control of mites (Acarina).

In the case of the mites, as contemplated herein, particularlf important are the spider mites (Tetranychidae), such as the common spider mite (*Tetranychus urticae*), the European red mite (*Paratetranychus pilosus*); blister mites, such as the currant blister mite (*Eriophyes ribis*) and the tarsonemids, such as *Tarsonemus pallidus*; and ticks; and the like. The effect is particularly strong on the post-embryonic stages of the mites.

The active compounds according to the instant invention can be utilized, if desired, in the form of the usual formulations or compositions with diluents or extenders, i.e., dispersible carrier vehicles, such as solutions, emulsions, suspension, emulsifiable concentrates, spray powders, pastes, soluble powders, dusting agents, granules, etc. These are prepared in known manner, for instance by extending the active compounds with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (e.g., benzene, toluene, xylene, etc.), halogenated, especially chlorinated, aromatic hydrocarbons (e.g., chlorobenzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.), and water; as well as dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.); whereas the following may be chiefly considered for use as carrier vehicle assistants, e.g., surface-active agents, for this purpose: emulsifying agents, such as non-ionic and anionic emulsifying agents (e.g., polyethylene oxide esters of fatty acids, polyethylene oxide ethers of fatty alcohols, alkyl sulfonates, aryl sulfonates, etc., and especially alkyl aryl-polyglyco ethers, magnesium stearate, sodium oleate, etc.); and dispersing agents, such as lignin, sulfite waste liquors, methyl cellulose, etc.

Such active compounds may be employed alone or in the form of mixtures with one another and, or with such solid or liquid dispersible carrier vehicles and/or with other known compatible active agents, especially plant protection agents, such as other fungicides, acaricides, insecticides, bactericides, herbicides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in aa amount substantially between about 0.1–95%, and preferably 0.5–90%, by weight of the mixture, whereas carrier composition mixtures suitable for direct application or field application generally contemplate those in which the active compound is present in an amount substantially between about 0.001–5%, preferably 0.05–0.5%, by weight of the mixture. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g., surface-active agent, such as an emulsifying agent and/or a dispersing agent, and an amount of the active compound which is effective for the purpose in question and which is generally about 0.001–95%, and preferably 0.05–95%, by weight of the mixture.

In particular, the present invention contemplates methods of selectively controlling or combating fungi and/or acarids, which comprises applying to at least one of (a) such fungi, (b) such acarids and (c) the corresponding habitat, i.e. the locus to be protected, a pesticidally, e.g., fungicidally and/or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application, e.g., the pests to be controlled, and specifically in the case of fungicidal use, whether for protective treatment of plants or for curative treatment thereof. Therefore, in special cases, it is possible to go above or below the aforementioned concentration ranges.

The fungicidal and acaricidal activities of the instant compounds are illustrated, without limitation, by the following examples.

EXAMPLE 1

Fusicladium test (apple scab) [protective]

Solvent:
    4.7 parts by weight of acetone
Emulsifier:
    0.3 parts by weight of alkylaryl polyglycol ether
Water:
    95 parts by weight The amount of the particular active compound required for the desired concentration of such active compound in the spray liquid is mixed with the stated amount of solvent, and the resulting concentrate is diluted with the stated amount of water which contains the stated emulsifier.

Young apple seedlings in the 4–6 leaf stage are sprayed with the spray liquid until dripping wet. The plants remain in a greenhouse for 24 hours at 20° C. and at a relative atmospheric humidity of 70%. The plants are then inoculated with an aqueous conidium suspension of the apple scab causative organism (*Fusicladium dendriticum Fuckel*) and incubated for 18 hours in a humidity chamber at 18–20° C. and at a relative atmospheric humidity of 100%.

The plants then again are placed in a greenhouse for 14 days.

15 days after inoculation, the infestation of the seedlings is determined as a percentage of the untreated but also inoculated control plants.

0% means no infestation; 100% means that the infestation is exactly as great as in the case of the control plants.

The particular active compounds, their concentrations and the results obtained can be seen from the following Table 1.

TABLE 1
[Fusicladium test (protective)]

| Active compound | | Infestation [1] |
|---|---|---|
| (A) | Control $(CH_3)_2NSO_2NSCFCl_2$–C₆H₅ (known) | 100 8 |
| (IV₁) | $(CH_3)_2NSO_2NSCFCl_2$–C₆H₃(CH₃)₂ | 1 |
| (V₁) | $(CH_3)_2NSO_2NSCFCl_2$–C₆H₃(CH₃)₂ | 3 |
| (III₂) | $(CH_3)_2NSO_2NSCFCl_2$–C₆H₄–C₂H₅ | 4 |

[1] As a percentage of the infestation of the untreated control with a concentration of active compound (in percent) of 0.003125.

EXAMPLE 2

Fusicladium test (apple scab) [curative]

Solvent:
    4.7 parts by weight of acetone
Emulsifier:
    0.3 parts by weight of alklaryl polyglycol ether
Water:
    95 parts by weight The amount of the particular active compound required for the desired concentration of such active compound in the spray liquid is mixed with the stated amount of solvent, and the resulting concentrate is diluted with the stated amount of water which contains the stated emulsifier.

Young apple seedlings in the 4–6 leaf stage are inoculated with an aqueous conidium suspension of the apple scab causative organism (*Fusicladium dentriticum* Fuckel) and incubated for 18 hours in a humidity chamber at 18–20° C. and at an atmospheric humidity of 100%. The plants then are placed in a greenhouse where they dry.

After standing for a suitable period of time, the plants are sprayed dripping wet with the spray liquid prepared in the manner described above. The plants then again are placed in a greenhouse.

15 days after inoculation, the infestation of the apple seedlings is determined as a percentage of the untreated but also inoculated control plants.

0% means no infestation; 100% means that the infestation is exactly as great as in the case of the control plants.

The particular active compounds, their concentrations, the period of time between inoculation and spraying and the results obtained can be seen from the following Table 2.

TABLE 2
[Fusicladium test (curative)]

| Active compound | | Residence period, hours [1] | Infestation [2] |
|---|---|---|---|
| | Control | 42 | 100 |
| (B) | $(CH_3)_2NSO_2NSCFCl_2$–C₆H₄–CH₃ (known) | 42 | 37 |
| (A) | $(CH_3)_2NSO_2NSCFCl_2$–C₆H₅ (known) | 42 | 27 |
| (IV₂) | $(CH_3)_2NSO_2NSCFCl_2$–C₆H₃(CH₃)₂ | 42 | 15 |
| (V₂) | $(CH_3)_2NSO_2$–N–SCFCl₂–C₆H₃(CH₃)₂ | 42 | 18 |

[1] Between inoculation and spraying.
[2] As a percentage of the infestation of the untreated control with a concentration of active compound (in percent) of 0.1.

EXAMPLE 3

Podosphaera test (powdery mildew of apples) [protective]

Solvent:
    4.7 parts by weight of acetone
Emulsifier:
    0.3 parts by weight of alkylaryl polyglycol ether
Water:
    95 parts by weight The amount of the particular active compound required for the desired concentration of such active compound in the spray liquid is mixed with the stated amount of solvent, and the resulting concentrate is diluted with the stated amount of water which contains the stated emulsifier.

Young apple seedlings in the 4–6 leaf stage are sprayed with the spray liquid until dripping wet. The plants remain in a greenhouse for 24 hours at 20° C. and at a relative atmospheric humidity of 70%. They are then inoculated by dusting with conidia of the apple powder mildew causative organism (*Podosphaera leucotricha* Salm.) and placed in a greenhouse at a temperature of 21–23° C. and at a relative atmospheric humidity of about 70%.

Ten days after the inoculation, the infestation of the seedlings is determined as a percentage of the untreated but also inoculated control plants.

0% means no infestation; 100% means that the infestation is exactly as great as in the case of the control plants.

The particular active compounds, their concentrations and the results obtained can be seen from the following Table 3.

TABLE 3
Podosphaera test [protective]

| Active compound | | Infestation[1] |
|---|---|---|
| Control | | 100 |
| (A) | $(CH_3)_2NSO_2NSCFCl_2$—phenyl (known) | 26 |
| (IV$_3$) | $(CH_3)_2NSO_2NSCFCl_2$—phenyl with 2-CH$_3$, 4-CH$_3$ | 10 |
| (V$_3$) | $(CH_3)_2NSO_2NSCFCl_2$—phenyl with 3-CH$_3$, 4-CH$_3$ | 5 |
| (III$_3$) | $(CH_3)_2NSO_2NSCFCl_2$—phenyl with 4-C$_2$H$_5$ | 8 |

[1] As a percentage of the infestation of the untreated control with a concentration of active compound (in percent) of 0.025.

EXAMPLE 4

Tetranychus test

Solvent:
 3 parts by weight of acetone
Emulsifier:
 1 part by weight of alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concenration.

Bean plants (*Phaseolus vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the active compound preparation is determined by counting the dead mites. The degree of destruction thus obtained is expressed as a percentage: 100% means that all the spider mites are killed whereas 0% means that none of the spider mites are killed.

The particular active compounds, their concentrations, the evaluation times and the results obtained can be seen from the following Table 4.

TABLE 4.—PLANT-DAMAGING MITES
[*Tetranychus urticae* resistant Wiesmoor]

| Active compound | | Concentration of compound in percent | Degree of destruction in percent after 8 days |
|---|---|---|---|
| (C) | $(CH_3)_2NSO_2NSCFCl_2$—phenyl with 2-CH$_3$ (known) | 0.2 / 0.025 / 0.01 | 100 / 60 / 20 |
| (IV$_4$) | $(CH_3)_2NSO_2NSCFCl_2$—phenyl with 2-CH$_3$, 3-CH$_3$ | 0.2 / 0.025 / 0.01 | 100 / 98 / 98 |
| (V$_4$) | $(CH_3)_2NSO_2NSCFCl_2$—phenyl with 3-CH$_3$, 4-CH$_3$ | 0.2 / 0.025 / 0.01 | 100 / 98 / 98 |

EXAMPLE 5

Piricularia test—liquid preparation of active compound

Solvent:
 1 part by weight of acetone
Dispersing agent:
 0.05 part by weight of sodium oleate
Additive:
 0.2 part by weight of gelatin
Water:
 98.75 parts by weight of H$_2$O The amount of the particular active compound required for the desired concentration in the spray liquor is mixed with the stated amount of solvent, and the resulting concentrate is diluted with the stated amount of water containing the stated dispersing agent and additive.

30 rice plants about 14 days old are sprayed with the spray liquor until dripping wet. The plants remain in a greenhouse at temperatures of 22–24° C. and a relative atmospheric humidity of about 70% until they are dry. The plants are then inoculated with an aqueous suspension of 100,000 to 200,00 spores/ml. and *Piricularia oryzae* and placed in a chamber at 24–26° C. and 100% relative atmospheric humidity.

5 days after inoculation, the infestation of all the leaves present at the time of inoculation is determined as a percentage of the untreated but also inoculated control plants. 0% means no infestation; 100% means that the infestation is exactly as great as in the case of the control plants.

The particular active compounds, their concentrations and the results obtained can be seen from the following Table 5.

TABLE 5
[Piricularia test/liquid preparation of active compound]

| Active compound | | Infestation[1] 0.05 | 0.025 |
|---|---|---|---|
| (D) | phthalimide-NSCCl$_3$ (known) | 3 | 25 |
| (IV$_5$) | $(CH_3)_2NSO_2NSCFCl_2$—phenyl with 2-CH$_3$, 4-CH$_3$ | 0 | 0 |

TABLE V.—Continued

| | | | |
|---|---|---|---|
| (V₅) | (CH₃)₂NSO₂—N—SCFCl₂ 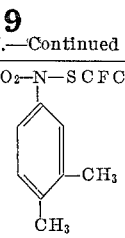 | 0 | 0 |

[1] As a percentage of the infestation of the untreated control with a concentration of active compound (in percent).

The production process of the present invention is illustrated, without limitation, by the following further examples.

EXAMPLE 6

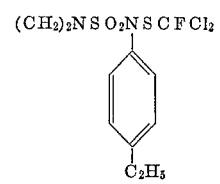

(III₄)

30 g. of dimethylsulfamic acid (4-ethylanilide) are dissolved in 100 ml. of dioxan with the addition thereto of 22.5 g. of fluorodichloromethanesulfenyl chloride, and 14.5 g. of triethylamine are then added at room temperature. The temperature rises to about 40° C. The reaction is allowed to proceed to completion and, after cooling, ice water is added. The reaction product thereupon crystallizes out. Filtering off with suction is effected, followed by digestion with methanol and, after drying, 27 g. of the above compound, i.e., N,N-dimethyl-N'-(4-ethylphenyl) - N'-fluorodichloromethylmercapto-sulfamide, of M.P. 72–74° C. are obtained.

EXAMPLE 7

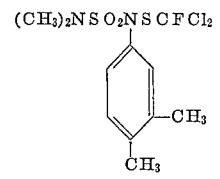

(V₆)

556 g. of dimethylsulfamic acid (3,4-xylidide) are dissolved in 2 liters of toluene with the addition thereto of 412 g. of fluorodichloromethanesulfenyl chloride, and 364 g. of dimethylbenzylamine are added as a rapid succession of drops at room temperature. The temperature is allowed to rise to 60° C. After addition of 700 ml. of water, the two layers are separated and the toluene solution, after drying, is concentrated in a vacuum. The residue crystallizes after addition of 500 ml. of methanol thereto. 663 g. of the above product, i.e. N,N-dimethyl-N'-(3,4-dimethylphenyl) - N'-fluorodichloromethylmercapto-sulfamide, of M.P. 69–70° C. are obtained.

EXAMPLE 8

In the same manner as in Example 7, there is obtained N,N - dimethyl - N' - (2,4-dimethylphenyl)-N'-fluorodichloromethylmercapto-sulfamide:

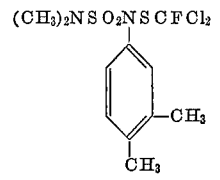

(IV₆)

M.P. 55–57° C.

It will be realized by the artisan that all of the foregoing compounds contemplated by the present invention possess the desired strong fungicidal and acaricidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi and/or acarids by application of such compounds to such fungi and/or acarids and/or their corresponding habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. N,N - dimethyl - N'-fluorodichloromethylmercaptosulfamide having the formula

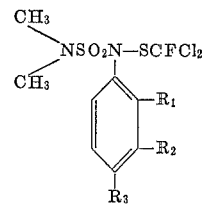

wherein $R_1$ is hydrogen when $R_2$ and $R_3$ are each methyl; $R_1$ and $R_3$ are each methyl when $R_2$ is hydrogen; and $R_1$ and $R_2$ are each hydrogen when $R_3$ is ethyl.

2. Sulfamide according to claim 1 wherein such compound is N,N - dimethyl-N,-(4-ethylphenyl)-N'-fluorodichloromethylmercapto-sulfamide having the formula

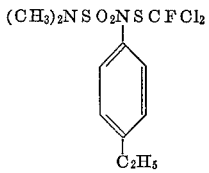

3. Sulfamide according to claim 1 wherein such compound is N,N - dimethyl-N'-(3,4-dimethylphenyl)-N'-fluorodichloromethylmercapto-sulfamide having the formula

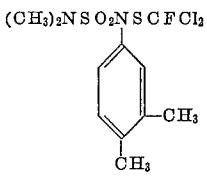

4. Sulfamide according to claim 1 wherein such compound is N,N-dimethyl-N'-(2,4-dimethylphenyl) - N'-fluorodichloromethylmercapto-sulfamide having the formula

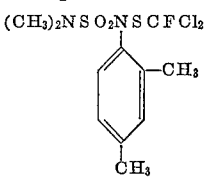

References Cited

UNITED STATES PATENTS 1,915,334   6/1933   Salzberg et al. _____ 260—243

OTHER REFERENCES

Chemical Abstracts, vol. 62, 3973d, 1965, Kuehle et al.

HENRY R. JILES, Primary Examiner

S. D. WINTERS, Assistant Examiner

U.S. Cl. X.R.

260—556; 424—298